April 21, 1936.     J. W. HOOLEY     2,038,291
JUNCTION BOX
Filed Jan. 28, 1935
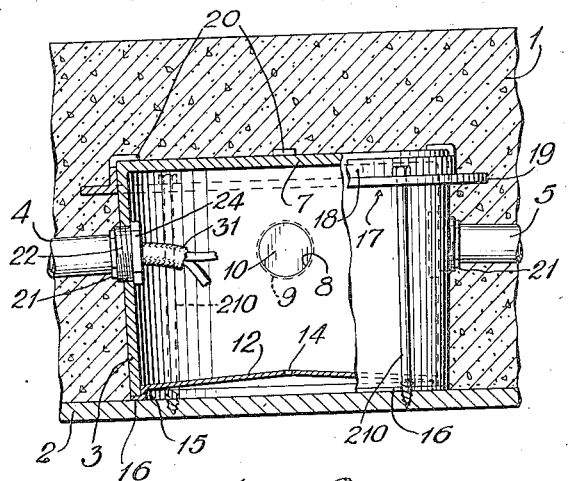
INVENTOR
JOHN W. HOOLEY
BY
ATTORNEY Patented Apr. 21, 1936

2,038,291

UNITED STATES PATENT OFFICE 2,038,291

JUNCTION BOX

John W. Hooley, Larchmont, N. Y.

Application January 28, 1935, Serial No. 3,695

4 Claims. (Cl. 247—15)

This invention relates to electrical fixtures in general and more especially to junction boxes and the like.

Among the objects of the present invention, it is aimed to provide a junction box that may be associated with a cover and one or more conduits on a job to constitute an electrically and mechanically connected system constituting an uninterrupted electrical conductor, the joints of which are water tight, gas tight and vapor tight and which during shipment may embrace a self-contained unit consisting of the junction box enclosed by the cover and containing within it the fittings required for a specified job.

It is still another object of the present invention to provide an improved junction box of the type specified composed of cast metal having a wall structure of uniform thickness throughout to prevent distortion during the stresses and strains that might occur during the metal treating process to which the box may be subjected in the course of manufacture.

It is still another object of the present invention to provide an improved junction box of the type specified composed of cast metal having a wall structure of uniform thickness throughout provided with internally threaded openings to be associated with discs composed of moldable substance such as soft metal to be filled into the openings readily removable when desired and otherwise effective to close up such openings to obstruct the admission of water, vapor, gas or the like.

It is still another object of the present invention to provide an improved junction box preferably having a tapered lateral wall to cooperate not only with the structure forming substance, such as concrete or the like to facilitate anchoring the box in the building structure against accidental displacement and in addition to cooperate with anchoring means consisting of an annular ring cooperating with such wall structure to be secured in place and to be in turn connected by bolts either to the wall forming composition of a building or to the form boards or the like.

It is still another object of the present invention to provide an improved junction box of the type specified that may be associated with one or more bushings each for association with a conduit to produce an uninterrupted continuous grounded connection for the system and thus positively protect the system from a haphazard loose connection.

It is still another object of the present invention to provide an improved junction box of the type specified that may be associated with one or more bushings each for association with a conduit to produce a metallically joined uninterrupted continuous electrical conductor which eliminates the necessity for bonding jumpers or such like devices to produce an effective compliance with the requirements of the National Electrical Code.

These and other features, capabilities and advantages of the invention will appear from the subjoined detail description of specific embodiments thereof illustrated in the accompanying drawing in which Figure 1 is a vertical section of a floor forming structure equipped with one embodiment of the present invention;

Fig. 2 is a vertical section showing the several parts of the junction box including its cover, anchoring ring and moldable opening closures before being installed in a job;

Fig. 3 is a vertical section of a floor or ceiling structure equipped with another embodiment of the present invention;

Fig. 4 is a horizontal section of a building forming wall equipped with still another embodiment of the present invention; and Fig. 5 is an enlarged sectional detail showing the connection between the junction box and a conduit.

In the embodiment shown in Fig. 1, the wall structure 1 composed as an instance of concrete is typical of any wall structure whether a lateral wall, floor or ceiling of a room although in the present instance for the purpose of this description, it will be assumed that the wall structure 1 illustrates a floor section in the process of formation with the form board or plate 2 still secured in place. In the process of constructing a floor before the concrete filling forming the structure 1 is introduced, the junction box 3 or the like is secured to the form board 2 and connected to the conduits 4 and 5.

The junction box 3, see Fig. 2, is preferably composed of cast metal having a conical lateral wall 6 and a base 7 integral with one another and preferably of a uniform thickness throughout to prevent distortion from any stresses or strains that might occur during the metal treating process to which the box 3 may be subjected in the course of manufacture. The conical wall 6 as clearly shown in Fig. 2, tapers inwardly as it recedes from the base 7.

In the lateral wall 6, there are formed one or more openings 8, the edge of each of which is provided with a screw thread 9. After the box 3 is so manufactured and preparatory to shipping the same to a job, each of the openings 8 is preferably completely sealed with a disc 10 composed of a moldable substance, such as aluminum, white metal or the like. The disc 10, see Fig. 2, before being inserted into an opening 8 preferably has convex faces 11 so that the disc after being inserted into an opening may have its faces 11 engaged by a pressing tool or the like to squash the disc so that its periphery will flow into intimate engagement with the thread 9 and thereby effectively seal the opening 8. The disc 10 at the left of the box 3 in Fig. 2 is shown before being inserted into the opening 8 while the disc 10 at the right of the box 3 in Fig. 2 is shown squashed into sealing position as above described.

After the box 3 is so equipped with the discs 10, it is then ready to act as a container to receive the fittings to be associated with it on a particular job whereupon before shipment the box preferably is closed by a cover 12 preferably composed of spring metal. The cover 12, see Fig. 2, has a central flexible disc portion 13 with or without a central opening 14, an annular rim 15 at the periphery of the disc portion 13 and a flange 16 extending outwardly from the edge of said rim 15. The rim 15 is preferably tapering as shown in Fig. 2 to facilitate insertion into the open end of the box 3. After being inserted into the open end of the box 3, the disc portion 13 is pressed inwardly into the position shown in Fig. 1, where the outer face of the rim 15 will snugly engage and frictionally anchor the cover 12 to the open end of the box 3 as shown in Fig. 1.

In order to secure the box 3 to the form board 2 as shown in Fig. 1, there is preferably provided an annular ring 17 having a cylindrical portion 18, an outwardly extending annular flange 19 and a number of bendable fingers 20 extending from the free end of the cylindrical portion 18. The flange 19 is preferably provided with a plurality of openings to receive bolts or screws, such as the screws 210 illustrated in Fig. 1.

The inner periphery of the ring 17 is preferably greater than the outer periphery of the wall 6 at its open end but less than the outer periphery of the wall 6 adjacent the base 7 so that the box 3 with its open end may with facility be passed into the ring 17 until the ring 17 approaches the base 7. After the ring approaches the base 7 into the position shown in Fig. 1, the fingers 20 will preferably be bent over into engagement with the base 7 and the ring 17 thus securely anchored to the box 3 without requiring the provision of any screw openings in the box 3 for securing the ring 17 thereto. The ring 17 may also be secured to the box 3 in the aforesaid manner before the box 3 is shipped to a job if desired.

After the ring 17 is so secured to the box 3, the box 3 is then ready to have one or more conduits according to the specification of the job under consideration, such as the conduits 4 and 5, connected to the wall 6.

In the present instance, the discs 10 in the openings 8 to which the conduits 4 and 5 are to be connected are first removed by a tool or the like to clear the threads 9 of such openings and then each opening 8 provided with a bushing 21, such as disclosed in my copending application Serial No. 3,694 filed January 28, 1935. The bushing 21, see Fig. 5, preferably has an external threaded formation 22 to engage the thread 9. The bushing 21 also has an internal screw threaded formation 23, and an enlargement 24 comprising an outer shoulder 25 and an inner shoulder 26.

The enlargement 24 is also preferably provided with a number of cut outs 27 to constitute a wrench or tool engaging formation. The other end of the bushing 21 is preferably provided with an extension 28 preferably also provided with cut outs, such as the cut outs 29 to form a wrench or tool engaging formation.

The bushing 21 is introduced from the inside of the box into an opening 8 and after being positioned so that its external thread is ready to engage the thread 9 of the opening 8 and its internal thread 23 is in position to engage the external thread 30 of the conduit 4 or 5 as an instance, the enlargement 24 is engaged by a wrench or tool and the bushing turned simultaneously to connect the conduit 4 or 5 and the box 3 to the bushing 21 and in turn to one another.

After the conduits and box are so connected and the electrical conductors are or are not passed through the conduits 4 and 5 to terminate in the box 3, see the end of the conduit 31 in Fig. 1, the box is ready again to receive the cover 12 and the fastening means, as for instance the screws 210 passed through the openings in the flange 19 and screwed into the mold board 2.

Thereupon the concrete forming the wall structure 1 may be poured. It will appear from the foregoing that the tapered form of the conical wall 6 will serve not only to cooperate with the ring 17 to anchor it in place but that it will also cooperate with the concrete forming the wall 30 structure 1 after it has been set to anchor the box 3 against accidental displacement.

It will also be seen from the foregoing that a construction of a junction box 3 free from openings except those closed by the discs 10 and connected to the conduits 4, 5 by the bushings 21 and in turn anchored to a form board 2 will not only produce in association with the conduits, such as the conduits 4 and 5 a mechanically and electrically connected system constituting an uninterrupted electrical conductor but will further provide a mechanically and electrically bonded job including joints that are vapor-proof, gas-proof and water-proof, eliminating necessity for bonding jumpers and the like.

It will also appear from the foregoing that a junction box made according to the present invention in association with the bushings 21 will permit the production of the several parts at a minimum cost of manufacture and also permit the assembly of the several parts on a job at a minimum cost of labor.

It will also appear from the foregoing that there is here provided a combination of junction box and bushing which may be connected to the conduits to produce a mechanically and electrically connected system that is water-tight, gas-tight and vapor-tight without rotating either box or conduits during the process of installation.

In the embodiment illustrated in Fig. 3, the junction box 3 is secured to a wall structure 32 which as an instance may already have been completed. In this case, holes are bored into the wall structure 32 and then the split expansion fittings 33 are inserted into the same and thereupon bolts 34 after being passed through the openings in the flange 19 in the ring 17 extending in the opposite direction to that shown in Fig. 1, are screwed into the expansion fittings 33 until the junction box 3 is properly positioned and firmly anchored to the wall structure 32.

In the embodiment illustrated in Fig. 4 a lateral wall structure is shown consisting of studs 35, lathe strips 36, 36 and plaster sections 37, 37. In this case, there is preferably provided a crossbar 38 extending from one stud 35 to another through which extend bolts 39 passed through the flange 19 as illustrated.

The junction box 3 with the ring 17 is preferably secured to the crossbar 38 before the lathe strips 36 are secured in place and at any rate before the plaster sections 37 are introduced.

Here too, the cover 12 is preferably secured to the open end of the junction box 3 before the sections 37 are introduced.

It is obvious that various changes and modifications may be made to the details of construction without departing from the general spirit of the invention as set forth in the appended claims.

It is also obvious that while the conformation of the junction box or outlet box 3 may be material for certain features hereinbefore disclosed, the box may assume any number of other shapes within the purview of the invention and similarly that this junction box may be provided with openings other than those disclosed for the purpose of accommodating switches, receptacles, fixtures and the like without departing from the general scope of the invention.

I claim:

1. The combination with a junction box having a base and a lateral wall tapering inwardly as it recedes from said base and composed of cast metal with a uniform thickness throughout, of an anchoring ring having fingers having a greater inner diameter than the outer diameter of said lateral wall at its open end but having a smaller inner diameter than the outer diameter of said lateral wall adjacent said base, said fingers being bent over into engagement with said base when said ring is positioned on said lateral wall adjacent said base to anchor said ring against displacement, and fastening means connecting said ring to a building structure.

2. The combination with a junction box having a base and a lateral wall tapering inward as it recedes from said base, of an anchoring ring having a cylindrical portion, fingers extending axially from one end, and a flange extending outwardly from the other end of said cylindrical portion, the inner periphery of said cylindrical portion having a greater diameter than the outer periphery of said wall adjacent the open end thereof but having a smaller diameter than the outer periphery of said wall adjacent to said base, said fingers being bent over into engagement with said base when said cylindrical portion is positioned on said lateral wall adjacent to said base, and fastening means for connecting said ring to a building structure.

3. The combination with a junction box having a base and a lateral wall tapering inward as it recedes from said base, of a round cover for the open end of said box having a dish shaped face proper, and a flange extending outwardly from the box and normally tapering in the opposite direction to the taper of said lateral wall when said cover is being inserted, said cover being composed of spring metal and normally bulging outwardly when and before said cover is being inserted but yieldable to be bulged inward after said cover is inserted thereby in turn wedging said flange into locking engagement with said lateral wall.

4. The combination with a junction box having a base and a lateral wall tapering inward as it recedes from said base, of an anchoring ring having a cylindrical portion and a flange extending outwardly from said cylindrical portion, the inner periphery of said cylindrical portion having a greater diameter than the outer periphery of said wall adjacent the open end thereof but having a smaller diameter than the outer periphery of said wall adjacent to said base, fastening means for connecting said ring to a building structure, and a round cover for the open end of said box having a dish-shaped face proper and a flange extending axially away from the box and normally tapering in the opposite direction to the taper of said lateral wall when said cover is being inserted, said cover being composed of spring metal and normally bulging outwardly when and before said cover is being inserted but yieldable to be bulged inwardly after said cover is inserted thereby in turn wedging said flange into locking engagement with said lateral wall.

JOHN W. HOOLEY.